United States Patent Office 3,264,179
Patented August 2, 1966

3,264,179
FUNGICIDAL PHOSPHONAMIDOTHIOATES
Paul B. Budde and Henry Tolkmith, Midland, Mich., assignors to The Dow Chemical Company, Midland, Mich., a corporation of Delaware
No Drawing. Filed Apr. 29, 1965, Ser. No. 452,004
5 Claims. (Cl. 167—33)

The present invention is concerned with imidazolyl phosphonamidothioate compound of the formula

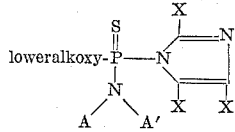

and which methods employing and compositions comprising the compound for the control of fungal organisms. In the above and succeeding formula, each X substituent independently represents a member selected from the group consisting of hydrogen, loweralkyl, and phenyl, the total number of carbon atoms in all X substituents being an integer of from 0 to 15, both inclusive; A represents a member selected from the group consisting of loweralkyl and A'; and each A' independently represents a member selected from the group consisting of benzyl, furfuryl, and tetrahydrofurfuryl. In the present specification and claims, the terms "imidazolyl phosphonamidothioate compound" and "imidazolyl phosphonamidothioate compounds" are employed to designate only a compound or compounds of this formula, herein above. The term "imidazolyl" is employed to refer only to a moiety of the formula

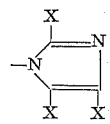

The term "loweralkyl" is employed in the present specification and claims to designate an alkyl radical being of from 1 to 4, both inclusive, carbon atoms.

The novel products of the present invention are liquids or crystalline solid materials which are somewhat soluble in many common organic solvents and of very low solubility in water. They exhibit the advantageous and highly desirable combination of high fungitoxicity and low mammaliam toxicity and are therefore very useful in the control of fungal organisms.

The novel compounds of the present invention are prepared by either of two methods. In a preferred method, the compounds are prepared by reacting a phosphoramidochloridothioate having the formula

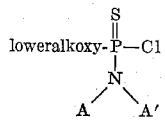

with an imidazole compound of the formula

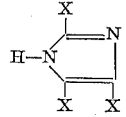

in the presence of a hydrogen chloride acceptor. The hydrogen chloride acceptor can be any organic tertiary amine, or the imidazole compound can be employed both as reactant and as hydrogen chloride acceptor.

The reaction conveniently is carried out in an inert organic liquid as reaction medium. Suitable liquids include the hydrocarbons, such as benzene, toluene, xylene, and cyclohexane; and ethers, such as diethyl ether, 1,2-dimethoxyethane, and tetrahydrofuran. It is generally preferred to avoid the use, as reaction medium, of any organic liquid which has a reactive hydrogen, because its use may result in side reactions.

While the precise amounts of the materials employed are not critical, it is preferred to employ substantially equimolecular proportions of the imidazole compound, phosphoramidochloridothioate, and hydrogen chloride acceptor. When imidazole compound is employed both as reactant and as hydrogen chloride acceptor, good results are obtained when employing one molecular proportion of phosphoramidochloridothioate and two molecular proportions of imidazole compound.

The reaction takes place smoothly in the temperature range of 0° to 60° C. with the production of the desired product and hydrogen chloride by-product, which appears as the hydrogen chloride salt of the hydrogen chloride acceptor. In carrying out the reaction, the reactants are mixed and contacted together in any convenient fashion. Thereafter, the resulting mixture is maintained for a period of time in the reaction temperature range, preferably with stirring or other mechanical agitation of the mixture. Following the completion of the reaction, the reaction mixture can be employed for the useful purposes of the present invention. However, in many applications of the present invention, it is preferred to separate the desired product compound from the reaction mixture. This is accomplished by conventional procedures. Most typically the by-product hydrogen chloride salt is removed from the reaction mixture by filtration to obtain a product-containing filtrate. Organic liquid serving as reaction medium is removed from this filtrate by evaporation under subatmospheric pressure to thereby separate the product. The separated product can be used without purification or can be purified by conventional procedures such as solvent extraction, and, in the instance of products which are solids, recrystallization.

In an alternative procedure, the imidazolyl phosphonamidothioate compounds can be prepared by reacting a phosphorodichloridothioate having the formula

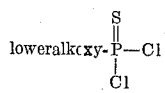

with an imidazole compound as previously defined, to form an intermediate imidazolyl phosphorochloridothioate having the structure

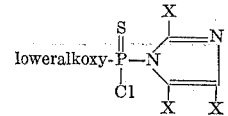

This intermediate is thereafter reacted with an amino reactant of the formula

to produce the desired imidazolyl phosphoramidothioate compound. The reactions conveniently are carried out in a reaction medium of the sort employed in the procedure hereinabove. Each step of this reaction procedure is carried out in the presence of a hydrogen chloride acceptor. An organic tertiary amine can be employed as hydrogen chloride acceptor, or the imidazole compound or amino reactant, respectively, can be employed both as reactant and as hydrogen chloride acceptor. Good results are obtained when employing, in the first reaction, substantially equimolecular proportions of phosphorodichloridothioate, imidazole compound, and hydrogen chloride acceptor, and, in the second reaction, substantially equimolecular proportions of intermediate imidazolyl phosphorochloridothioate, amino reactant, and hydrogen chloride acceptor. The reactions are carried out at temperatures of from 0° C. to 60° C. The temperature can be controlled by regulating the rate of mixing and contacting the reactants together and by external cooling. The by-product in both steps of the reaction is hydrogen chloride, which appears as the hydrogen chloride salt of the hydrogen chloride acceptor employed. Following the reaction, the desired product can be separated in accordance with the conventional procedures as previously described.

In the preparation procedures hereinabove discussed, the imidazolyl moiety is introduced by reaction of a phosphorus-containing compound, as variously defined, with the imidazole compound, as defined. The imidazole compound ordinarily occurs as a tautomeric form in which no hydrogen is fixably positioned at any given ring-nitrogen atom. Accordingly, in the reaction of many of these reactants, in the methods hereinabove presented, isomeric products are produced. The products can be separated by such conventional separation procedures as chromatographic separation and fractional crystallization.

The following examples illustrate the best methods now known for the practice of the present invention and will enable those skilled in the art to practice the present invention.

*Example 1.—O-ethyl P-imidazol-1-yl-N-furfuryl-N-methyl phosphonamidothioate*

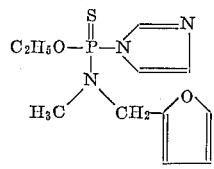

O-ethyl N-furfuryl-N-methyl phosphoramidochloridothioate (254 grams; 1.0 mole) is mixed with 1 liter of benzene. To the resulting mixture, 136 grams of imidazole (2.0 mole) are added portionwise to the mixture over about five hours. The addition is carried out with the reaction mixture at a temperature of about 25° C. After the completion of the addition, the reaction mixture is stirred for twelve hours at a temperature of 24–26° C. Thereafter, the reaction mixture is filtered to separate the by-product imidazole hydrochloride salt, the by-product salt washed with three 250-milliliter portions of benzene, and the filtrate and wash liquor combined and concentrated by evaporation of benzene under subatmospheric pressure to yield O-ethyl P-imidazol-1-yl-N-furfuryl-N-methyl phosphonamidothioate. The product is a liquid.

Other representative products of the present invention are the following:

| Name of Product | Identifying Property M.W. |
|---|---|
| O-methyl P-(2-methylimidazol-1-yl)-N-benzyl-N-tert-butyl phosphonamidothioate | 337.4 |
| O-ethyl P-(4,5-diphenylimidazol-1-yl)-N-isopropyl-N-furfuryl phosphonamidothioate | 465.6 |
| O-n-butyl P-(2-methyl-4,5-diphenylimidazol-1-yl)-N-benzyl-N-methyl phosphonamidothioate | 503.7 |
| O-ethyl P-imidazol-1-yl-N-methyl-N-(tetrahydrofurfuryl) phosphonamidothioate | Liquid |
| O-isobutyl P-(4,5-di-n-propylimidazol-1-yl)-N-methyl-N-(tetrahydrofurfuryl) phosphonamidothioate | 401.6 |
| O-sec-butyl P-(2-ethylimidazol-1-yl)-N-furfuryl-N-n-propyl phosphonamidothioate | 369.5 |
| O-n-propyl P-(2-n-butylimidazol-1-yl)-N-benzyl-N-tetrahydrofurfuryl phosphonamidothioate | 435.6 |
| O-ethyl P-imidazol-1-yl-N-benzyl-N-methyl phosphonamidothioate | Liquid |
| O-ethyl P-(2-phenylimidazol-1-yl)-N,N-difurfuryl phosphonamidothioate | 427.5 |
| O-isopropyl P-(2-methyl-4,5-di-n-propylimidazol-1-yl)-N,N-bis(tetrahydrofurfuryl) phosphonamidothioate | 471.6 |
| O-ethyl P-imidazol-1-yl-N,N-dibenzyl phosphonamidothioate | 371.5 |
| O-ethyl P-(4(and 5)-methylimidazol-1-yl)-N-benzyl-N-methyl phosphonamidothioate | 309.4 |

It has been discovered that the present imidazolyl phosphonamidothioate compounds are adapted to be employed for the control of a wide range of fungi, especially those fungal organisms ordinarily found on the aerial portions of plants, such as, for example, cherry leaf spot, apple scab, rice blast, powdery mildew, Helminthosporium (leaf spot on grasses, cereals, and corn), and late blight. The compounds can also be applied in dormant applications to the woody surfaces of plants or to orchard floor surfaces for the control of the over-wintering spores of many fungi. In addition, the imidazolyl phosphonamidothioate compounds can be applied to seeds to protect the seeds from the attack of fungal organisms such as rot and mildew. Also, the compounds can be distributed in soil at fungicidal concentrations to control the organisms which attack seeds and plant roots, particularly the fungal organisms of root rot and mildew.

In further operations, the compounds can be included in inks, adhesives, soaps, cutting oils, polymeric materials, or in oil or latex paints, to prevent mold, mildew, and the degradation of such products resulting from microbial attack. Also, the compounds can be distributed in textile or cellulosic materials, or can be employed in the impregnation of wood and lumber to preserve and protect such products from the attack of the microbial agents of rot, mold, mildew and decay. The foregoing environments are merely illustrative of the many habitats in which these agents can be distributed to obtain excellent fungal control.

It is an advantage of the present invention that compositions containing these compounds can be applied to growing vegetation in amounts required for effective control without significant injury to the plants. It is a further advantage that the compounds of the present invention have a very low toxicity to mammals. It is another advantage that a single application of the compounds will provide a residual and extended control of fungi over a period of several months. Also, it is an advantage that the imidazolyl phosphonamidothioate compounds are effective in eliminating established fungal infestation as well as in providing residual and extended control against fungal attack. Further, the compounds have been found to be translocated in plants and thus it is an advantage of the present invention that the compounds provide a systemic protection against the plant attacking organisms. It is a yet further advantage that the imidazolyl phosphonamidothioate compounds can be handled with a minimum of danger from accidental mammalian exposure thereto because of their low mammalian toxicity.

The method of the present invention comprises contacting a fungal organism with a fungicidal amount of one or more of the imidazolyl phosphonamidothioate compounds. However, the present invention also embraces the employment of a liquid, powder or dust composition containing one or more of the toxicants. Such compositions are adapted to be applied to the living plants without substantial injury to the plants. In preparing toxicant compositions, the imidazolyl phosphonamidothioate compounds can be modified with one or more of a plurality of additaments including organic solvents, petroleum distillates, water or other liquid carriers, surface active dispersing agents, and finely divided inert solids. In such compositions, the imidazolyl phosphonamidothioate compound toxicants oftentimes are present in a concentration from about 2 to 98 percent by weight. Depending upon the concentration in the composition of the imidazolyl phosphonamidothioate compound, such augmented compositions are adapted to be employed for the control of the undesirable fungi or employed as concentrates and subsequently diluted with additional inert carrier to produce the ultimate treating compositions. In compositions where the adjuvant or helper is a finely divided solid, a surface-active agent, or the combination of a surface-active agent and a liquid additament, the carrier cooperates with the active component so as to facilitate the invention, and to obtain an improved and outstanding result.

The exact concentration of the imidazolyl phosphonamidothioate compound employed in the compositions for application to the fungal organism and/or its habitat can vary provided a fungicidal dosage of toxicant is applied either on the organism or its environment. This dosage of toxicant is dependent in part upon the susceptibility of the particular organism to the particular compound employed. In general, good results are obtained with liquid compositions containing from about 0.0001 to 2.0 percent by weight of toxicant; in some operations, however, compositions containing as much as from 2 to 98 percent by weight are conveniently employed, as, for example, in applications to orchard floor surfaces for the control of spores. With dusts, good results are usually obtained with compositions containing from 0.001 to 2.0 percent or more by weight of toxicant. In some circumstances, it is preferred to employ dust compositions containing as much as from 2 to 98 percent or more by weight of toxicant. Where the compositions are to be applied to living plants, it is preferred that the toxicant be present in an amount not to exceed about 0.8 percent in liquid compositions and 1.0 percent in dusts. In terms of acreage application, good controls of fungal organisms are obtained when the imidazolyl phosphonamidothioate compounds are applied to plots or growing plants at a dosage of from 0.004 to 3 or more pounds per acre.

In the protection and preservation of inks, adhesives, cutting oils, paints, textiles and paper, good results are obtained when the compounds are incorporated in such products in the amount of at least 0.0001 percent by weight. In the preservation of wood, excellent results are obtained when the compounds are incorporated by conventional treatment in the wood in the amount of at least 0.0001 pound per cubic foot of wood.

In the preparation of dust compositions, the toxicant products can be compounded with any of the finely divided solids such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface-active dispersing agents, such as fuller's earth, bentonite, attapulgite, and other clays. Depending upon the proportions of ingredients, these dust compositions can be employed for the control of fungi or employed as concentrates and subsequently diluted with an additional solid surface-active dispersing agent or with pyrophyllite, chalk, talc, gypsum, and the like to obtain the desired amount of active ingredient in a composition adapted to be employed for the control of fungi. Also, such dust compositions, when employed as concentrates, can be dispersed in water, with or without the aid of dispersing agents, to form spray mixtures.

Further, the imidazolyl phosphonamidothioate compounds or a liquid or dust concentrate composition containing such compounds can be incorporated in intimate mixture with surface-active despersing agents such as non-ionic emulsifying agents to form spray compositions. Such compositions are readily employed for the control of fungi or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce emulsifiable concentrates which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions are oil-soluble and include the non-ionic emulsifiers such as condensation products of alkylene oxides with the inorganic acids, polyoxyethylene derivatives of sorbitan esters, complex ether alcohols and the like. Suitable organic liquids which can be employed in the composition include petroleum oils and distillates, toluene, and synthetic organic oils. The surface-active dispersing agents are usually employed in liquid compositions in the amount of from 0.1 to 20 percent by weight of the combined weight of the dispersing agent and active compound.

When operating in accordance with the present invention, the imidazolyl phosphonamidothioate compounds or a composition containing the compounds can be applied to the fungal organisms to be controlled, or to their habitats in any convenient fashion, e.g., by means of hand dusters or sprayers. Applications to the aboveground portions of plants conveniently can be carried out with powder dusters, boom sprayers, high-pressure sprayers, and spray dusters. In foliar applications, the employed compositions should not contain any appreciable amount of phytotoxic diluents. In large scale operations, dusts or low volume sprays can be aplied from airplanes.

In other operations, the imidazolyl phosphonamidothioate compounds can be dispersed in an atmosphere, particularly within a space temporarily or permanently enclosed such as a greenhouse, railroad car, or the like, to control fungal organisms therewithin, to protect contents exposed to the atmosphere, and to control airborne fungal organisms such as spores and the like. In these operations, an imidazolyl phosphonamidothioate compound can be placed upon a surface of which the temperature facilitates volatilization, at a desired rate, of the compound or composition containing the same into the atmosphere; also, in an alternate embodiment, a compound can be used as an aerosol; that is, incorporated with a propellant and, if desired, a cosolvent, and the resulting composition released from a pressure container into the atmosphere.

The following examples further illustrate the present invention.

*Example 2*

50 parts by weight of O-ethyl P-imidazol-1-yl-N-furfuryl-N-methyl phosphonamidothioate is mixed and ground with 18 parts of diatomaceous earth (Celite 209), 24 parts of a hydrous aluminum silicate (Barden clay), 6 parts of an alkyl aryl sulfonate (Nacconol NRSF), and 2 parts of a substituted benzoic alkyl sulfonic acid (Daxad No. 27) to prepare a composition which can be used in accordance with the foregoing teachings. In a similar manner, other compositions are prepared by employing one of the following in place of the O-ethyl P-imidazol-1-yl-N-furfuryl-N - methyl phosphonamidothioate:

O-methyl P-(2-methylimidazol-1-yl)-N-benzyl-N-tert-butyl phosphonamidothioate
O-ethyl P-(4,5-diphenylimidazol-1-yl)-N-isopropyl-N-furfuryl phosphonamidothioate
O-n-butyl P-(2-methyl-4,5-diphenylimidazol-1-yl)-N-benzyl-N-ethyl phosphonamidothioate
O-ethyl P-imidazol-1-yl-N-methyl-N-(tetrahydrofurfuryl) phosphonamidothioate
O-isobutyl P-(4,5-di-n-propylimidazol-1-yl)-N-methyl-N-(tetrahydrofurfuryl) phosphonamidothioate
O-sec-butyl P-(2-ethylimidazol-1-yl)-N-furfuryl-N-n-propyl phosphonamidothioate Also, 90 parts by weight of O-ethyl P-imidazol-1-yl-N-furfuryl-N-methyl phosphonamidothioate and 10 parts by weight of a sorbitan monolaurate polyoxyethylene derivative (Tween 20) are mixed together to prepare another composition which also can be employed according to the foregoing teachings. In a similar manner, other compositions are prepared by employing one of the following in place of O-ethyl P-imidazol-1-yl-N-furfuryl-N-methyl phosphonamidothioate:

O-n-propyl P-(2-n-butylimidazol-1-yl)-N-benzyl-N-tetrahydrofurfuryl phosphonamidothioate O-ethyl P-(2-phenylimidazol-1-yl)-N,N-difurfuryl phosphonamidothioate O-isopropyl P-(2-methyl-4,5-di-n-propylimidazol-1-yl) N,N-bis(tetrahydrofurfuryl) phosphonamidothioate O-ethyl P-imidazol-1-yl-N,N-dibenzyl phosphonamidothioate O-ethyl P-imidazol-1-yl-N-benzyl-N-methyl phosphonamidothioate In other procedures, aqueous compositions are prepared by mixing and grinding together in a ballmill 0.06 part by weight of one of the imidazolyl phosphonamidothioate compounds, 0.06 part of an alkyl aryl sulfonate (Nacconol NR), and 0.06 part of Daxad No. 27, and 200 parts of water.

These compositions are adapted to be employed for the control of fungi or to be dispersed in water to provide aqueous compositions having desirable wetting properties. The compositions are useful for the distribution of the imidazolyl phosphonamidothioate compounds in fungicidal amounts.

Example 3

Four parts by weight of O-ethyl P-imidazol-1-yl-N-furfuryl-N-methyl phosphonamidothioate, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. A portion of this concentrate composition is dispersed in water to produce an aqeuous spray composition containing 75 parts of the subject compound per million parts by weight of ultimate mixture. The resultant composition is sprayed with an atomizing spray nozzle using air pressure at 20 pounds per square inch on young potato plants which are about 6 inches tall. The applications are carried out so as to give thorough coverage of all surfaces of the leaves of the plants without appreciable run-off.

Following the applications, the spray compositions are allowed to dry upon the leaf surfaces and the plants then inoculated by spraying with a suspension of viable spores of *Phytophthera infestans* (late blight). Untreated potato plants of the same maturity are similarly inoculated to serve as checks. Immediately following the inoculation, all plants are placed in a moist chamber and maintained at 70° F. under saturated humidity conditions for 24 hours. Thereafter, the plants are set aside under greenhouse conditions for about five days and observed for the development of the lesions of late blight caused by the Phytophthera organisms to determine the percent control of this organism.

Observation about one week following the inoculations shows substantially complete controls of *Phytophthora infestans* on the plants sprayed with the composition containing O-ethyl P-imidazol-1-yl-P-furfuryl-N-methyl phosphonamidothioate. At the time of the observations, the leaves of the untreated check plants are found to be heavily covered with lesions of *Phytophthora infestans*.

Example 4

Other of the imidazolyl phosphonamidothioate compounds are employed for the control of late blight, in the procedures of Example 3 except that in some instances the subject compound is present in the aqueous spray composition in a concentration other than that employed in Example 3.

The results are set forth in the following table:

| Test Compound | Parts of Test Compound per Million Parts by Weight of Composition | Percent Kill and Control of *Phytophthera infestans* |
|---|---|---|
| O-ethyl P-imidazol-1-yl-N-methyl-N-(tetrahydrofurfuryl) phosphonamidothioate | 150 | 100 |
| | 75 | 98 |
| O-ethyl P-imidazol-1-yl-N-benzyl-N-methyl phosphonamidothioate | 150 | 100 |
| | 75 | 100 |
| | 37 | 98 |

Example 5

Spray compositions each containing 4000 parts of one of the imidazolyl phosphonamidothioate compounds per million parts by weight of ultimate composition and each prepared according to the procedures of Example 2 were employed for the control of *Erysiphe polygoni*, an organism causing powdery mildew on bean plants. In such operations, each spray composition was sprayed on a separate group of pinto bean plants through an atomizing nozzle using a pressure of 20 pounds per square inch. The applications were carried out so as to give thorough coverage of all surfaces of the plants. The plants were permitted to dry and then inoculated with spores of *Erysiphe polygoni*. Untreated pinto bean plants were similarly inoculated to serve as checks. All plants were held under conditions conducive to the growth of *Erysiphe polygoni*. After about one week, the plants were observed for the development of powdery mildew. The imidazolyl phosphonamidothioate compounds, the rate at which they were employed, and the results of the observations, are set forth in the following table.

| Test Compound | Parts of Test Compound per Million Parts by Weight of Composition | Percent Kill and Control of *Ersiphe polygoni* |
|---|---|---|
| O-ethyl P-imidazol-1-yl-N-furfuryl-N-methyl phosphonamidothioate | 4,000 | 100 |
| O-ethyl P-imidazol-1-yl-N-methyl-N-(tetrahydrofurfuryl) phosphonamidothioate | 4,000 | 100 |

Similar results are obtained when employing as imidazolyl phosphonamidothioate compound one of the following:

O-n-butyl P-(2-methyl-4,5-diphenylimidazol-1-yl)-N-benzyl-N-ethylphosphonamidothioate;

O-ethyl P-(2-phenylimidazol-1-yl)-N,N-difurfuryl phosphonamidothioate; and

O-n-propyl P-(2-n-butylimidazol-1-yl)-N-benzyl-N-tetrahydrofurfuryl phosphonamidothioate.

The phosphoramidochloridothioate compounds employed as starting products in the preparation of the compounds of the present invention are prepared by known procedures. In these procedures, thiophosphoryl chloride, which has the formula

is reacted successively in either order or simultaneously with (1) a lower alkanol of the formula

and with (2) an amine compound having the formula

the latter reaction being carried out in the presence of a hydrogen chloride acceptor. The hydrogen chloride acceptor can be an organic tertiary amine or the amine compound, as above defined, can be employed both as reactant and as hydrogen chloride acceptor. Good results are obtained when employing the materials in amounts which represent equimolecular proportions of thiophosphoryl chloride, lower alkanol, amine compound, and hydrogen chloride acceptor. Conveniently the reaction is carried out in an inert organic liquid as reaction medium, such as, for example, diethyl ether, benzene, carbon tetrachloride, or methylene chloride.

The present application is directed to and concerned with the disclosure and claiming of the invention as described hereinbefore. The present application is also directed to the disclosure and claiming of the invention in compounds, methods, or compositions, comprising or employing any subgeneric group or class of imidazolyl phosphonamidothioate compounds which may be obtained by any permutation or combination of the alternative expressions in the several compound definitions to be found hereinbefore.

We claim:
1. The method which comprises contacting a fungal organism with a fungicidal amount of an imidazolyl phosphonamidothioate compound of the formula:

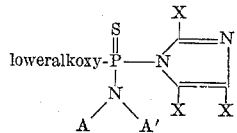

wherein each X substituent independently represents a member selected from the group consisting of hydrogen, loweralkyl, and phenyl, the total number of carbon atoms in all X substituents being an integer of from 0 to 15, both inclusive; A represents a member selected from the group consisting of loweralkyl and A'; and each A' independently represents a member selected from the group consisting of benzyl, furfuryl, and tetrahydrofurfuryl.

2. The method according to claim 1 wherein said imidazolyl phosphonamidothioate is employed in the form of a composition comprising said compound in intimate admixture with a parasiticide adjuvant as a carrier thereof.

3. The fungicidal composition comprising an imidazolyl phosphonamidothioate compound in intimate mixture with from 0.1 to 20 percent by weight of a surface-active dispersing agent, said imidazolyl phosphonamidothioate compound of the formula:

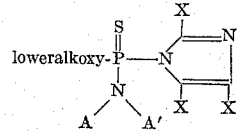

wherein each X substituent independently represents a member selected from the group consisting of hydrogen, loweralkyl, and phenyl, the total number of carbon atoms in all X substituents being an integer of from 0 to 15, both inclusive; A represents a member selected from the group consisting of loweralkyl and A'; and each A' independently represents a member selected from the group consisting of benzyl, furfuryl, and tetrahydrofurfuryl.

4. An aqueous dispersion of the composition of claim 3 wherein the imidazolyl phosphonamidothioate compound is present in such composition in an amount of at least 0.0001 percent by weight.

5. The fungicidal composition comprising from 2 to 98 percent by weight of an imidazolyl phosphonamidothioate compound in intimate admixture with a finely divided inert solid, said imidazolyl phosphonamidothioate compound being of the formula

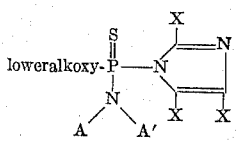

wherein each X substituent independently represents a member selected from the group consisting of hydrogen, loweralkyl, and phenyl, the total number of carbon atoms in all X substituents being an integer of from 0 to 15, both inclusive; A represents a member selected from the group consisting of loweralkyl and A'; and each A' independently represents a member selected from the group consisting of benzyl, furfuryl, and tetrahydrofurfuryl.

References Cited by the Examiner

UNITED STATES PATENTS

| | | | |
|---|---|---|---|
| 2,493,318 | 1/1950 | Schenle et al. | 260—309 |
| 2,928,841 | 3/1960 | McConnell et al. | 260—309.5 |
| 2,994,637 | 8/1961 | Bimber | 167—33 |
| 3,111,525 | 11/1963 | Mcltzer | 260—309.2 |
| 3,111,526 | 11/1963 | Koopmans et al. | 260—309.2 |
| 3,136,690 | 6/1964 | Beriger | 167—33 |

FOREIGN PATENTS 1,273,603   9/1961   France.

JULIAN S. LEVITT, *Primary Examiner.*

S. J. FRIEDMAN, *Assistant Examiner.*